Feb. 6, 1940.  W. H. STROM  2,188,987
ARTIFICIAL FLY HOLDER FOR A FISHERMAN'S KIT
Filed May 23, 1938
FIG.I.
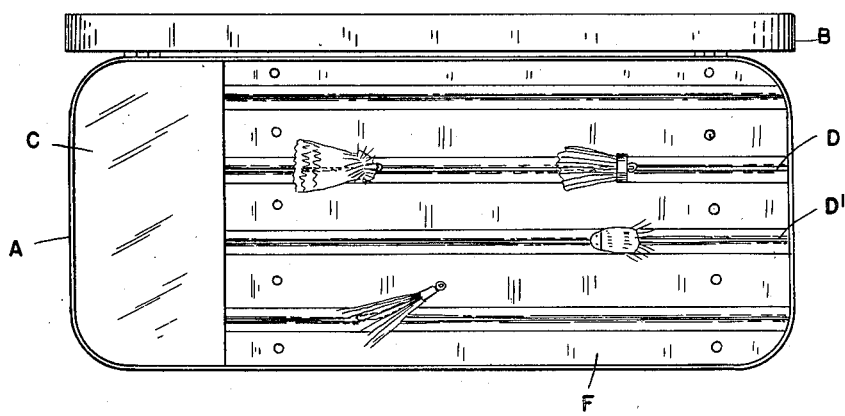
FIG.4.
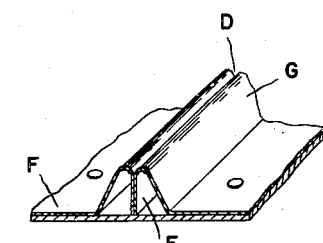
FIG.3.
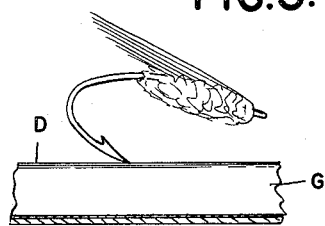
FIG.5.
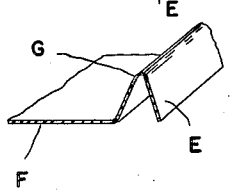
FIG.2.
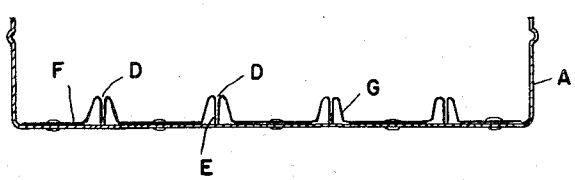
INVENTOR
WALTER HENRY STROM
BY
ATTORNEYS Patented Feb. 6, 1940

2,188,987

UNITED STATES PATENT OFFICE 2,188,987

ARTIFICIAL FLY HOLDER FOR A FISHERMAN'S KIT

Walter Henry Strom, Detroit, Mich.

Application May 23, 1938, Serial No. 209,590

2 Claims. (Cl. 43—32)

The invention relates to artificial fly holders more particularly designed for use in fishermen's kits, and the invention consists in the construction as hereinafter set forth.

In the drawing:

Figure 1 is a plan view of a fisherman's kit or tackle box to which my improvements are applied.

Figure 2 is a cross section thereof;

Figure 3 is an enlarged longitudinal section through one of the fly holding ribs;

Figure 4 is a sectional perspective view thereof;

Figure 5 is a cross section through one of the strips for forming the holder ribs.

In the present state of the art tackle boxes have been provided with fly holders formed of pairs of adjacent cork or rubber strips between which the hook of the fly may be inserted. With such constructions the barb of the hook may catch in the strips so as to render it difficult to remove the fly without injury to either the hook or holder. Furthermore, there is considerable frictional resistance to either the insertion of the hook or its removal. To overcome such defects I have devised a construction where the holder is formed of material having a smooth hard surface that will not catch the barb and which is also sufficiently yieldable and resilient to permit of easy insertion and removal of the hook. Preferably, I use for this material thin sheet metal of a non-corrodible nature, such as brass or bronze, and which is both flexible and resilient. For instance metal which is .003 of an inch in thickness is suitable for such purpose.

My improved holder is applicable to any suitable tackle box or kit, such as a box A having the hinge cover B and if desired provided with a compartment C for live bait. The fly holders are formed of a plurality of split ribs D, D', etc., spaced from each other and extending longitudinally of the box. Each rib comprises a pair of abutting flanges E on strips F which are secured to the bottom of the box. Preferably, these strips have return-bent edge portions G projecting upward from the portions secured to the bottom of the box, the return portions of which form the strips E. The return bends are initially of a V-shaped form, but when the strips are secured in position the flanges E will be pressed together and arranged perpendicular to the bottom of the box as shown in Figures 2 and 4.

Because of the thinness of the metal it is exceedingly flexible so that the flanges E may be easily separated from each other when the hook is inserted therebetween. However, there is sufficient resiliency to retain the hook from accidental disengagement, while at the same time the force required for insertion and withdrawal is so slight as to avoid any danger of injury to the fly. The V-shaped form of the return bends also facilitates engagement of the fly with the holder by drawing the point of the hook upward on the side of the rib until it engages the crevice between the two portions thereof. As the flanges E project downward adjacent to or in contact with the bottom of the box, there is no danger of the hook or barb catching beneath these flanges to prevent disengagement.

What I claim as my invention is:

1. An artificial fly holder for a fisherman's kit comprising a pair of extended continuous thin flexible and resilient metallic strips provided with transversely extending substantially V-shaped return-bent portions abutting against each other, said strips being locally separable for the insertion of a hook therebetween without displacement of the other portions of the strips.

2. A fisherman's kit comprising a box or receptacle and a series of thin flexible and resilient metallic strips secured to the bottom of said receptacle and provided with marginal transversely extending substantially V-shaped return bends abutting against each other, the return portions of said return bends extending substantially to the bottom of the box and being normally under tension to clamp a hook when inserted therebetween.

WALTER HENRY STROM.